July 12, 1966 R. DESSOULAVY 3,260,859

SELECTIVELY CONTROLLED SHUNT TRANSISTOR CONTROLLING CONDUCTION OF SERIES TRANSISTOR AND SIGNAL TRANSMISSION

Filed Sept. 19, 1963 2 Sheets-Sheet 1

3,260,859
Patented July 12, 1966

3,260,859

SELECTIVELY CONTROLLED SHUNT TRANSISTOR CONTROLLING CONDUCTION OF SERIES TRANSISTOR AND SIGNAL TRANSMISSION

Roger Dessoulavy, 45 Ave. Vulliemin, Lausanne, Switzerland

Filed Sept. 19, 1963, Ser. No. 310,033
Claims priority, application Switzerland, Sept. 20, 1962, 11,109/62
3 Claims. (Cl. 307—88.5)

Figure 1:
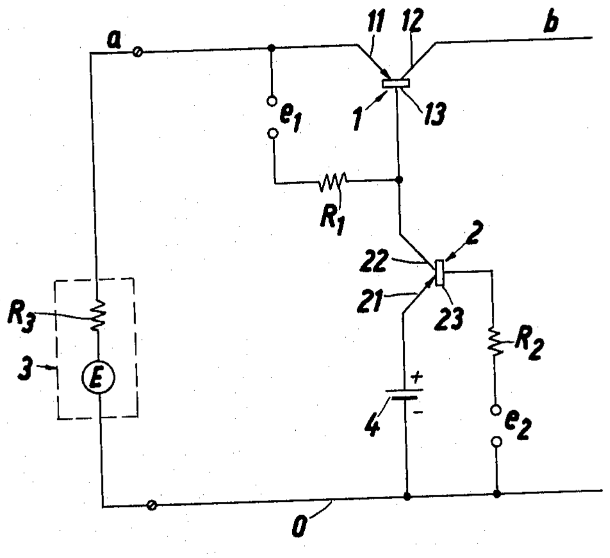

The present invention relates to an electronic switching and circuit interrupting network. The invention further relates to improvements in the transmission and formation of pulses More particularly, the invention relates to an electronic network permitting the selective periodic or non-periodic, continued or intermittent application of a voltage or voltages to the input of an elevation network and the selective blocking of the voltage or voltages therefrom.

Networks according to the invention are, for example, to be used to facilitate production of pulse coded signals representing the magnitude of electric voltages. For example, in the art of communication and telemetery pulse codes are used to transmit intelligence by multi-channel-time-multiplex transmission. In this case, voltages individually associated with several channels are to be compared successively with a reference voltage which is being varied in predetermined steps. After each such step of reference voltage variation, there will be another comparison with the same channel line voltage. For such voltage comparison it is necessary that the voltage of one channel be applied for a particular period of time to a comparator while during this period of time the reference voltage is changed. After completion of comparison of the voltage in one channel, the next channel is coupled to the comparator, etc. Whenever one channel is effectively coupled to the comparator, the other channels must be blocked therefrom.

It is thus an object of the present invention to provide a circuit network in which an electric voltage transmission channel and line can be blocked or opened selectively. This selective blocking or opening is to occur in synchronism with a pulse sequence, while the control effect of such pulses can be overridden by a control voltage which is applied with reference to a zero line common to all transmission channels. The latter control voltage is to block all but one transmission line, and the single open line then transmits the pulses.

According to one aspect of the present invention in a preferred embodiment thereof, it is suggested, to govern any channel or line of the character described by a transistor having its collector-emitter path inserted accordingly. A first control voltage is applied via a resistor and between the base electrode of this transistor and one of the other electrodes. The latter base electrode connects to the reference or zero line via a series circuit connection of the emitter collector path of a second transistor and a source of fixed potential. The base potential and current of the second transistor is controlled by a second control voltage which, when rendering the second transistor conductive, effectively overrides the control effect of the first control voltage in the first transistor. In particular, the first control voltage may be applied as stated via a transformer having its input side galvanically decoupled from the transistor tenwork as described, while the second control voltage is, in effect, applied as between reference line and base electrode of the second transistor, thus being in galvanic connection with the transistor network.

Figure 2:
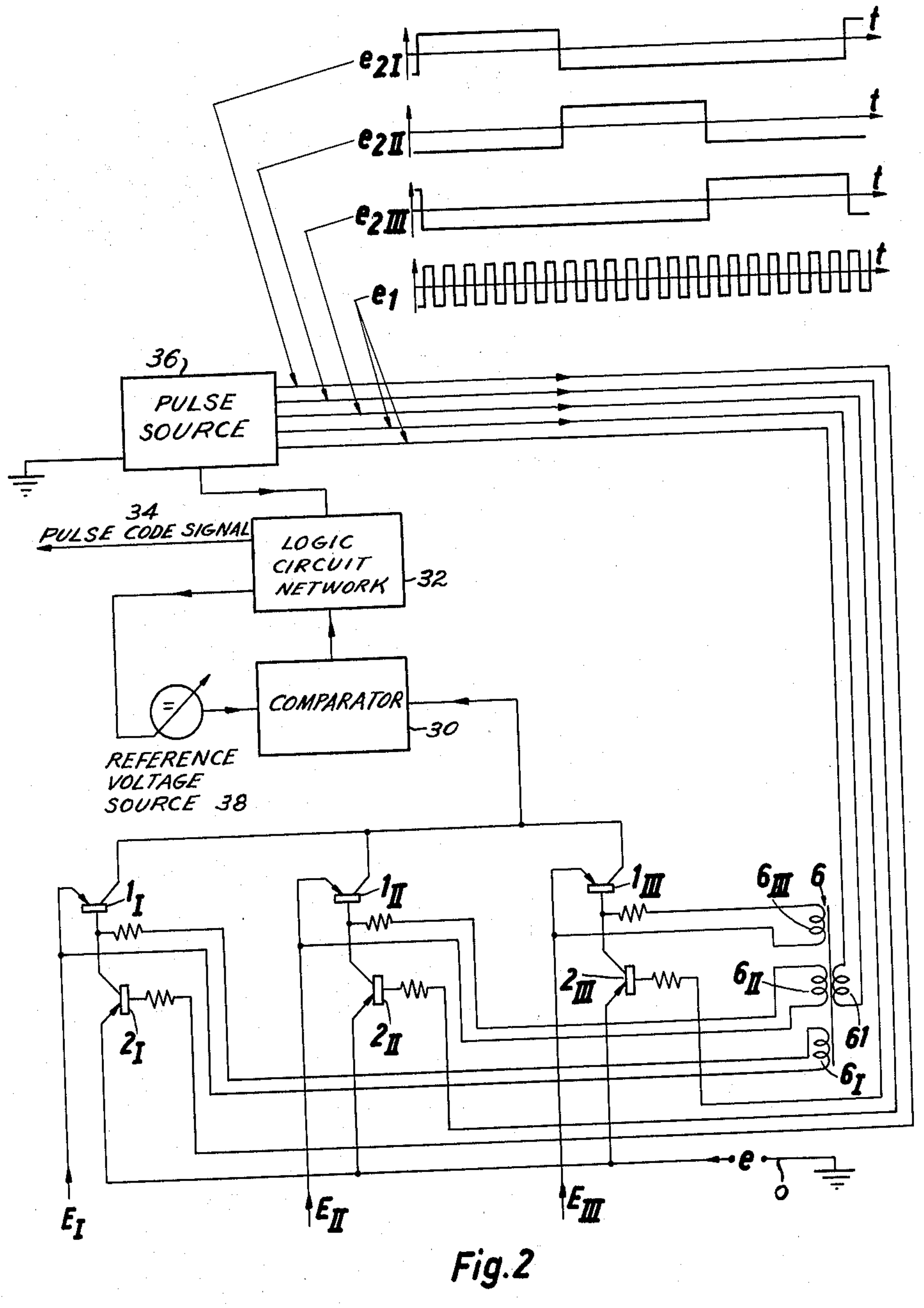

While the specification concludes with claims particularly pointing out and distinctly claiming the subject matter which is regarded as the invention it is believed, that the invention, the objects, and features of the invention and further objects, features and advantages thereof will be better understood from the following description taken in connection with the accompanying drawing in which:

FIGURE 1 illustrates schematically a wiring diagram of a circuit interrupting network according to the preferred embodiment of the invention; and FIGURE 2 illustrates a block diagram for a multi-channel pulse code transmission network having several networks of the type described with reference to FIG. 1; FIG. 2 includes pulse-time diagrams for pulses as they appear in several pulse transmission lines therein.

Proceeding now to the detailed description of the drawing, in FIG. 1 there is shown a voltage transmission channel or line *a–b*, and the flow of electric current in this line is governed by a transistor 1 having the usual electrodes, an emitter 11, a collector 12 and a base 13. It can also be said that transistor 1 governs the application of the voltage potential line portion *a* to line portion *b*. The emitter-collector path of transistor 1 constitutes part of the line *a–b*. Portion *a* of line *a–b* is directly connected to a voltage source 3 applying a voltage E thereto. Voltage source 3 is further connected to ground or mass at a reference or zero line 0, and has an electromotoric power E and an inner resistance $R_3$. Source 3 may be a D.C. voltage source in which case the negative potential is applied to reference line 0, but source 3 may also be an A.C source with E being the peak value.

A first control voltage source $e_1$ is connected between base 13 and emitter 11, there being a biasing and limiting resistor $R_1$ connected between base 13 and one pole of source $e_1$, whereas the other pole of source $e_1$ connects directly to emitter 11.

A second transistor 2 has its collector electrode 22 connected to the base electrode 13 of transistor 1, whereas the emitter electrode 21 is connected to the plus pole of a voltage source 4 of fixed potential such as a battery, the negative pole of which being connected to reference line 0.

The voltage *e* of battery 4 exceeds the voltage E of source 3. Transistor 2 has its base electrode 23 connected to another control voltage source $e_2$ via an ohmic resistor $R_2$. Source $e_2$ connects also to return or reference line 0. Resistor $R_2$ limits the base current of transistor 2. For reasons of simplifying the description, reference characters $e_1$ and $e_2$ serve to designate control voltage sources as well as the voltages of such sources.

The network as described thus far is dimensioned so that the following relation is true:

$$\frac{R_1}{R_3} > \frac{e_1}{e-E}$$

The control voltage $e_1$ opens and closes the transistor 1, i.e., governs its state of conductivity so as to control the current flow in line *a–b*, particularly from emitter 11 to collector 12, whereby the application of voltage potential E to line portion *b* is governed therewith.

The control voltage $e_2$ serves to override the control effect of voltage $e_1$ in that voltage $e_2$ can keep transistor 1 conductive regardless of further values at source $e_1$. The entire network operates in detail as follows:

Assuming, that momentarily voltage $e_2$ exceeds the voltage *e* of battery 4, then the base 23 is positively biased with reference to the emitter 21, and transistor 2 is non-conductive. In this case, the effective control voltage between emitter 11 and base 13 of transistor 1 is substantially determined by source $e_1$, so is the state of conduction of transistor 1. Accordingly, the current flow in line *a–b* is governed, in effect, by voltage $e_1$, transistor 1 is low ohmic and voltage E is being applied to line portion *b*.

In order to block the control effect from source $e_1$, the control voltage $e_2$ is reduced or even its polarity is being reversed so that the base 23 is rendered more negative relative to the emitter 21 of transistor 2, and correspondingly transistor 2 is being rendered conductive. Upon suitable selection of the voltage $e_2$, transistor 2 may be driven to saturation. In this case, the battery 4 is effectively coupled in between line $a$–$b$ and line 0 and the battery voltage is being applied to the base 13. In effect, the battery 4 now determines the voltage as between emitter 11 and base 13.

The voltage $e$ of battery 4 is to be larger than E as stated and the positive terminal of battery 4 now connects to base 13 through the conductive and low ohmic transistor 2. Hence, emitter 11 is being rendered negative relative to base 13, and transistor 1 is thus rendered non-conductive. The current flow in line $a$–$b$ is now being interrupted by the yet blocked transistor 1, and the potential E is removed from line portion $b$.

In view of the relation given above, the voltage $e_1$ does not suffice to render emitter 11 positive relative to base 13. Hence, the control effect of voltage source $e_1$ is being suppressed, and the current flow in line $a$–$b$ is now in effect being governed by the control voltage $e_2$ independent from the control voltage $e_1$ and from the development of the voltage at this first control voltage source $e_1$.

Proceeding now to the description of FIG. 2, there is shown a series of circuit interrupting networks of the type described above with reference to FIG. 1. The network of FIG. 2 specifically comprises a transmitter for multi-channel time multiplex transmissions with modulation by pulse encoding. In particular, there are shown in FIG. 2 three networks of the type shown in FIG. 1 and respectively comprising transistors $1_I$, $2_I$; $1_{II}$, $2_{II}$; $1_{III}$, $2_{III}$. The collector electrodes of transistors $1_1$, $1_{11}$ and $1_{111}$ are interconnected, leading to the input terminal of a comparator 30. The emitter electrodes of these three transistors respectively connect to three sources of voltage potential $E_I$, $E_{II}$ and $E_{III}$. These three voltage sources constitute three individual channels, and it is the object of this circuit network of FIG. 2 to successively and periodically transmit the three voltages $E_I$, $E_{II}$ and $E_{III}$ as pulse coded intelligence.

In the following, a block diagram of FIG. 2 shall be described briefly, which block diagram does not constitute per se the invention but illustrates a network presently improved. In particular, the improvement is effective in the input circuit of the comparator to which are applied the voltages $E_I$, $E_{II}$, $E_{III}$. The inventive improvement governs the mode of applying the voltages of these three channels of the comparator. This mode and its purpose will be understood better with a brief description of the block diagram.

It is of primary importance that not the voltages themselves of the three channels will be transmitted, but pulse code signals representing the voltages as binary coded signals are being formed for transmission.

In order to produce such pulse code signals respectively representing voltage values, the momentary input voltage of the comparator is successively compared with several fixed reference voltages of different values. The output of the comparator as resulting from each individual comparison is fed to a logic circuit network 32. The logic circuit network responds to every such individual comparison in the comparator and determines the next respectively applicable reference voltage. That is to say, first voltage $E_I$ is to be applied to the comparator, and all available reference voltages are placed in comparing relationship with $E_I$. The logic circuit network further produces the overall result of the several comparisons with $E_I$ as pulse coded binary signal. After completion of one comparison cycle, the next voltage $E_{II}$ is to be compared successively with the reference voltages, and the overall result of such comparison is again transmitted as pulse code 34 etc.

The inventive improvement now relates to a network enabling successive application of the voltages of several channels to the input line or terminal of a comparator, while such application of any individual voltage (1) occurs sufficiently long for completion of comparison with several reference voltages, and (2) is carried out in strict synchronism with the cyclically calling on the several reference voltages for such comparison.

Accordingly, the inventive network as illustrated by way of example applies each individual voltage $E_I$, $E_{II}$, $E_{III}$ sufficiently long to the comparator, but intermittently at a rate corresponding to the rate of the stepwise varying reference voltage.

In order to enable comparison cyclically or otherwise of the several reference voltages as being also applied to the comparator, with voltage $E_I$, then $E_{II}$ and finally $E_{III}$, it is necessary to provide a network which, in fact, applies these voltages $E_I$, $E_{II}$, $E_{III}$ to the comparator as pulses. This is being done with the aid of the transistor networks described above.

Current flow from the three channels and application of their respective voltages to the comparator is governed by the transistors $1_I$, $1_{II}$, $1_{III}$, and the respective emitter-collector paths serve specifically to respectively apply voltages $E_I$, $E_{II}$, $E_{III}$ to the comparator or block them therefrom.

The transistors $1_I$, $1_{II}$, $1_{III}$ are first controlled in unison by a control voltage $e_I$, commonly applied to all these three transistors. This common control voltage $e_I$ is applied as clock pulses which are derived from a pulse source 36 (see block diagram) preferably at a constant rate. The pulse source feeds these clock pulses to a primary winding 61 of a transformer 6 having three secondary windings $G_I$, $G_{II}$, $G_{III}$ respectively connected across the base-emitter paths of transistors $1_I$, $1_{II}$, $1_{III}$. The positive clock pulses $e_1$ render the transistors $1_I$, $1_{II}$, $1_{III}$ nonconductive. The rate of clock pulse production is determined by (or determines) the delivery of reference voltages, that is to say, that whenever a new reference voltage is applied to the comparator, there will be produced another clock pulse $e_1$. Accordingly, in the preferred form, the clock pulses $e_1$ also control the cycle of reference voltage application. The drawing shows symbolically a connection between the pulse source and the logic network and from there a connection to the reference voltage source 38.

Thus, clock pulses $e_1$ determine (1) the stepwise application of different reference voltages to the comparator, and (2) the periodic blocking and opening for current conduction of all transistors $1_I$, $1_{II}$, $1_{III}$.

The control effect of voltage $e_1$ for either transistor $1_I$, $1_{II}$, $1_{III}$ can be overriden by second control voltages $e_{2I}$, $e_{2II}$, and $e_{2III}$, respectively. These second voltages are also derived from the pulse source and individually applied across the base-emitter paths of transistors $2_I$, $2_{II}$, $2_{III}$. The voltages $e_{2I}$ etc. appear as block pulses for a duration and in such mutual phase relationship that always two of the transistors $1_I$, $1_{II}$, $1_{III}$ are rendered nonconductive, whereas the respectively conductive one of the latter transistors feeds its line voltage ($E_I$, or $E_{II}$, or $E_{III}$) to the comparator but at an intermittent rate as determined by clock pulses $e_1$, which are effective always in that transistor $1_1$ etc. is not blocked from the pulse source of $e_{2I}$ or $e_{2II}$ or $e_{2III}$.

It will be appreciated that the above network operates as follows:

The clock pulses are applied continuously to transformer 6 tending to periodically render all the transistors $1_I$, $1_{II}$, $1_{III}$ conductive and nonconductive. Simultaneously thereto, there is a positive block pulse $e_{2I}$ applied to transistor $2_I$ blocking same so that, indeed, transistor $1_I$ applies voltage $E_I$ to the comparator but intermittently with an intermission rate determined by the clock pulses.

Transistors $2_{II}$ and $2_{III}$ both are conductive which, in turn, block transistors $1_{II}$ and $1_{III}$ so that the clock pulses are ineffective in the latter two transistors. Concurrently and at clock pulse rate, the reference voltages are applied to the comparator and the logic network produces a code signal corresponding to $E_I$.

Pulse $e_{2I}$ must be available sufficiently long to enable the calling on all available reference voltages.

Upon completion of such comparison, voltage pulse $e_{2II}$ appears, while transistor $2_I$ is rendered conductive. Pulse $e_{2II}$ blocks transistor $2_{II}$ and now the voltage $E_1$ is removed from the comparator while voltage $E_{II}$ appears at the comparator and at the intermittent rate as determined by the clock pulses $e_1$. Again, a comparison cycle as between the several reference voltages and voltage $E_{II}$ of the second channel is carried out, whereafter transistor $2_{II}$ is rendered conductive again and transistor $2_{III}$ is blocked by the then appearing voltage $e_{2III}$. Disappearance of voltage $e_{2III}$ completes the cycle of encoding of the outputs of the three channels.

It should be mentioned that in case it might be desirable to control one or two of the transistors $1_I$ etc. in opposite phase relationship to the other transistors as far as clock pulses are concerned. In this case it is necessary only to reverse the polarity of connection of the respectively associated transformer secondary.

In FIG. 1 it was assumed for purposes of facilitating the description, that the auxiliary or reference voltage $e$ was drawn from a battery such as 4. This is not a necessary limitation, and it is within the scope of practicing the present invention to use a voltage derived from the main power supply. This is particularly evident from FIG. 2 showing that voltage source $e$ can be common to all the transistors $2_I$, $2_{II}$, $2_{III}$.

It will be understood that the usage of three channels is an example only and the number of channels is restricted only by reasons of general practicality and purpose of employment. For each channel, there will be provided one pulse outlet $e_2$, and the general rule is, that only one channel at a time is to be opened while the remaining ones are to be blocked. This rule determines phase relationship and duration of pulse and pulse pause for each control voltage $e_2$.

The embodiments of the invention have been described with pnp-type transistors, but it is possible to use transistors of the npn-type, in which case it is only necessary to reverse the polarity of the voltages or connections thereof. It is further possible to reverse the emitter collector path within the connection of each governed by such transistor in which case the residual or leakage current is being reduced.

The invention is not limited to the embodiments described above, but all changes and modifications thereof not constituting departures from the spirit and scope of the invention are intended to be covered by the following claims:

What is claimed is:

1. Electronic switching and circuit interrupting network for governing the application of a voltage through a line having a potential relative to a line of reference potential, comprising:

a first transistor having its emitter-collector path inserted in said line to be governed;

a first control voltage source resistively connected to the base and one of the collector and emitter electrodes of said first transistor;

a second transistor;

a source of fixed voltage potential connected in series circuit connection to the emitter-collector path of said second transistor, said series circuit connection being connected between said base of said first transistor and said reference line;

and a second control voltage connected between said reference line and the base of said second transistor, said first and second control voltages connected to respectively render said first and second transistor selectively conductive and nonconductive, whereby said second transistor when conductive, overrides the control effect of said first control voltage and blocks said first transistor.

2. Electronic switching and circuit interrupting network for governing the application of a voltage through a line having a potential relative to a line of reference potential, comprising:

a first transistor having its emitter-collector path inserted in said line to be governed;

a source of clock pulses;

a transformer for connecting said source of clock pulses to the base and one of the collector and emitter electrodes of said first transistor, a resistor connected in the secondary circuit of said transformer, the voltage from said secondary circuit constituting a first control voltage;

a second transistor;

a source of fixed voltage potential connected in series circuit connection to the emitter-collector path of said second transistor, said series circuit connection being connected between said base of said first transistor and said reference line;

and a second control voltage connected between said reference line and the base of said second transistor, said first and second control voltages connected to respectively render said first and second transistor selectively conductive and nonconductive, whereby said second transistor when conductive, overrides the control effect of said first control voltage and blocks said first transistor.

3. Electronic switching and control network for applying voltages from a plurality of channel lines to a common comparator input line, there being a common reference line, the combination comprising:

a plurality of first transistors, one for each of said plurality of channel lines, said first transistors each having one of their collector and emitter electrodes connected to said common input line, while the other one of said collector and emitter electrodes connects to the respective channel line;

a common source of clock pulses;

a transformer having its primary winding connected to said source of clock pulses and having a plurality of secondary windings, one for each of said first transistors;

resistive means for respectively connecting said secondary windings to the base electrodes and said other electrodes of said first transistors;

a second transistor for each first transistor;

a source of fixed voltage connected to the emitter collector path of each second transistor, each said second transistor with fixed voltage source connected to the base of one first transistor and said reference line;

and a second control voltage connected between said reference line and the base of each said second transistors, said first and second control voltages connected to respectively render said first and second transistor selectively conductive and nonconductive, whereby said second transistor when conductive, overrides the control effect of said first control voltage and blocks said first transistor.

References Cited by the Examiner

UNITED STATES PATENTS

| | | | |
|---|---|---|---|
| 2,829,281 | 4/1958 | Van Overbeek | 307—88.5 |

ARTHUR GAUSS, *Primary Examiner.*

J. S. HEYMAN, S. D. MILLER, *Assistant Examiners.*